(12) United States Patent
Rastogi et al.

(10) Patent No.: US 12,457,197 B2
(45) Date of Patent: Oct. 28, 2025

(54) SUPPORTING A VENDOR-NEUTRAL POLICY CONFIGURATION ON A NETWORK DEVICE WITH A VENDOR-SPECIFIC POLICY CONFIGURATION

(71) Applicant: Juniper Networks, Inc., Sunnyvale, CA (US)

(72) Inventors: Rajat Rastogi, Alwar (IN); Sandeep Hassan Ramanna, Fremont, CA (US); Vikas G, Udupi (IN)

(73) Assignee: Juniper Networks, Inc., Sunnyvale, CA (US)

( * ) Notice: Subject to any disclaimer, the term of this patent is extended or adjusted under 35 U.S.C. 154(b) by 215 days.

(21) Appl. No.: 18/335,933

(22) Filed: Jun. 15, 2023

(65) Prior Publication Data

US 2024/0422130 A1 Dec. 19, 2024

(51) Int. Cl.
*H04L 9/40* (2022.01)
(52) U.S. Cl.
CPC ........ *H04L 63/0245* (2013.01); *H04L 63/101* (2013.01); *H04L 63/20* (2013.01)
(58) Field of Classification Search
CPC ... H04L 63/0245; H04L 63/101; H04L 63/20; H04L 41/40; H04L 41/0894; H04L 63/0236; H04L 63/0263; H04L 63/0227; H04L 9/40; H04Q 9/00
See application file for complete search history.

(56) References Cited

U.S. PATENT DOCUMENTS

| | | | |
|---|---|---|---|
| 9,369,431 B1 * | 6/2016 | Kirby | H04L 63/20 |
| 10,212,138 B1 * | 2/2019 | Diamant | H04L 9/3234 |
| 10,558,542 B1 | 2/2020 | A. et al. | |
| 2017/0131980 A1 * | 5/2017 | Velandy | H04L 69/24 |
| 2017/0187577 A1 | 6/2017 | Nevrekar et al. | |
| 2020/0366575 A1 * | 11/2020 | Rajendran | H04L 41/044 |
| 2022/0166717 A1 * | 5/2022 | Pfosi | H04L 45/748 |
| 2022/0197876 A1 * | 6/2022 | Sterne | H04L 41/145 |
| 2022/0329489 A1 | 10/2022 | Nayyar et al. | |
| 2022/0382611 A1 * | 12/2022 | Kapish | G06F 11/0709 |
| 2023/0009328 A1 * | 1/2023 | Ding | H04L 63/20 |
| 2023/0179525 A1 * | 6/2023 | Pai | H04L 43/10 709/223 |

FOREIGN PATENT DOCUMENTS

EP 3672157 B1 3/2021

OTHER PUBLICATIONS

Extended European Search Report for Application No. EP231917634 mailed on Feb. 7, 2024, 08 pages.
Yang, J., et al., "An Automata-based Security Policy Translation for Network Security Functions, "International Conference on Information and Communication Technology Convergence, 2018, pp. 268-272.

* cited by examiner

*Primary Examiner* — Christopher B Robinson
*Assistant Examiner* — Tania M Pena-Santana
(74) *Attorney, Agent, or Firm* — Harrity & Harrity, LLP

(57) ABSTRACT

A network device may receive a vendor-neutral policy configuration, and may translate the vendor-neutral policy configuration to a first family filter and a second family filter. The network device may associate each of the first family filter and the second family filter with a routing instance and an interface, and may generate a policy configuration supported by the network device based on the first family filter, the second family filter, the routing instance, and the interface.

20 Claims, 11 Drawing Sheets

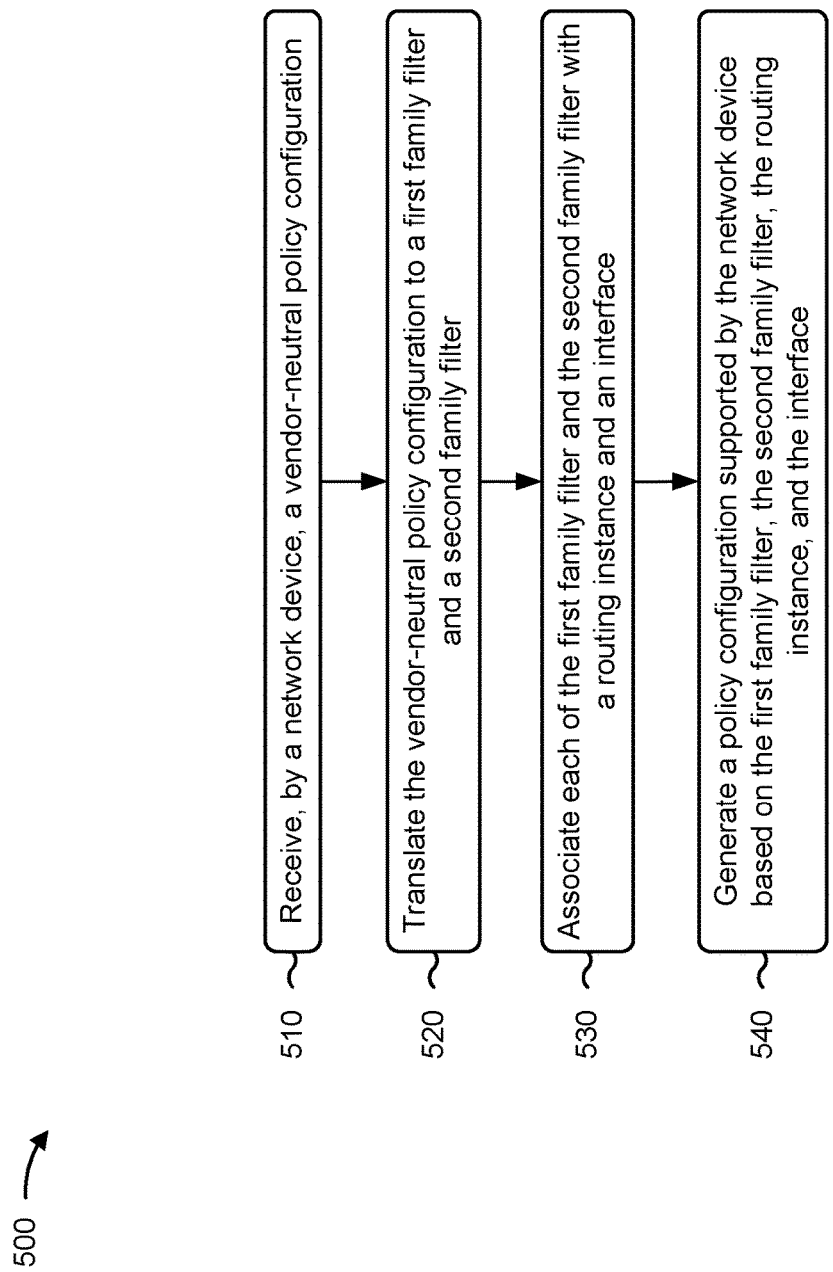

SUPPORTING A VENDOR-NEUTRAL POLICY CONFIGURATION ON A NETWORK DEVICE WITH A VENDOR-SPECIFIC POLICY CONFIGURATION

BACKGROUND

A firewall is a component in a network device that provides network security, classifies network traffic, monitors network traffic, and/or the like based on various conditions applied to network traffic characteristics, such as content, entry points, exit points, and/or the like. For example, if a packet satisfies a set of conditions, the firewall may perform one or more actions.

SUMMARY

Some implementations described herein relate to a method. The method may include receiving, by a network device, a vendor-neutral policy configuration, and translating the vendor-neutral policy configuration to a first family filter and a second family filter. The method may include associating each of the first family filter and the second family filter with a routing instance and an interface, and generating a policy configuration supported by the network device based on the first family filter, the second family filter, the routing instance, and the interface.

Some implementations described herein relate to a network device. The network device may include one or more memories and one or more processors coupled to the one or more memories. The one or more processors may be configured to receive a vendor-neutral policy configuration, and translate the vendor-neutral policy configuration to a first family filter and a second family filter. The one or more processors may be configured to associate each of the first family filter and the second family filter with a routing instance and an interface, and generate a policy configuration supported by the network device based on the first family filter, the second family filter, the routing instance, and the interface. The one or more processors may be configured to receive packets, and process the packets with the policy configuration to generate first operational state data associated with the first family filter and second operational state data associated with the second family filter.

Some implementations described herein relate to a non-transitory computer-readable medium that stores a set of instructions. The set of instructions, when executed by one or more processors of a network device, may cause the network device to receive a vendor-neutral policy configuration, and translate the vendor-neutral policy configuration to a first family filter and a second family filter. The set of instructions, when executed by one or more processors of the network device, may cause the network device to associate each of the first family filter and the second family filter with a routing instance and an interface, and generate a policy configuration supported by the network device based on the first family filter, the second family filter, the routing instance, and the interface, wherein the policy configuration is for a firewall component of the network device.

BRIEF DESCRIPTION OF THE DRAWINGS

FIG. 5 is a flowchart of an example process for supporting a vendor-neutral policy configuration on a network device with a vendor-specific policy configuration.

DETAILED DESCRIPTION

Figure 1A:
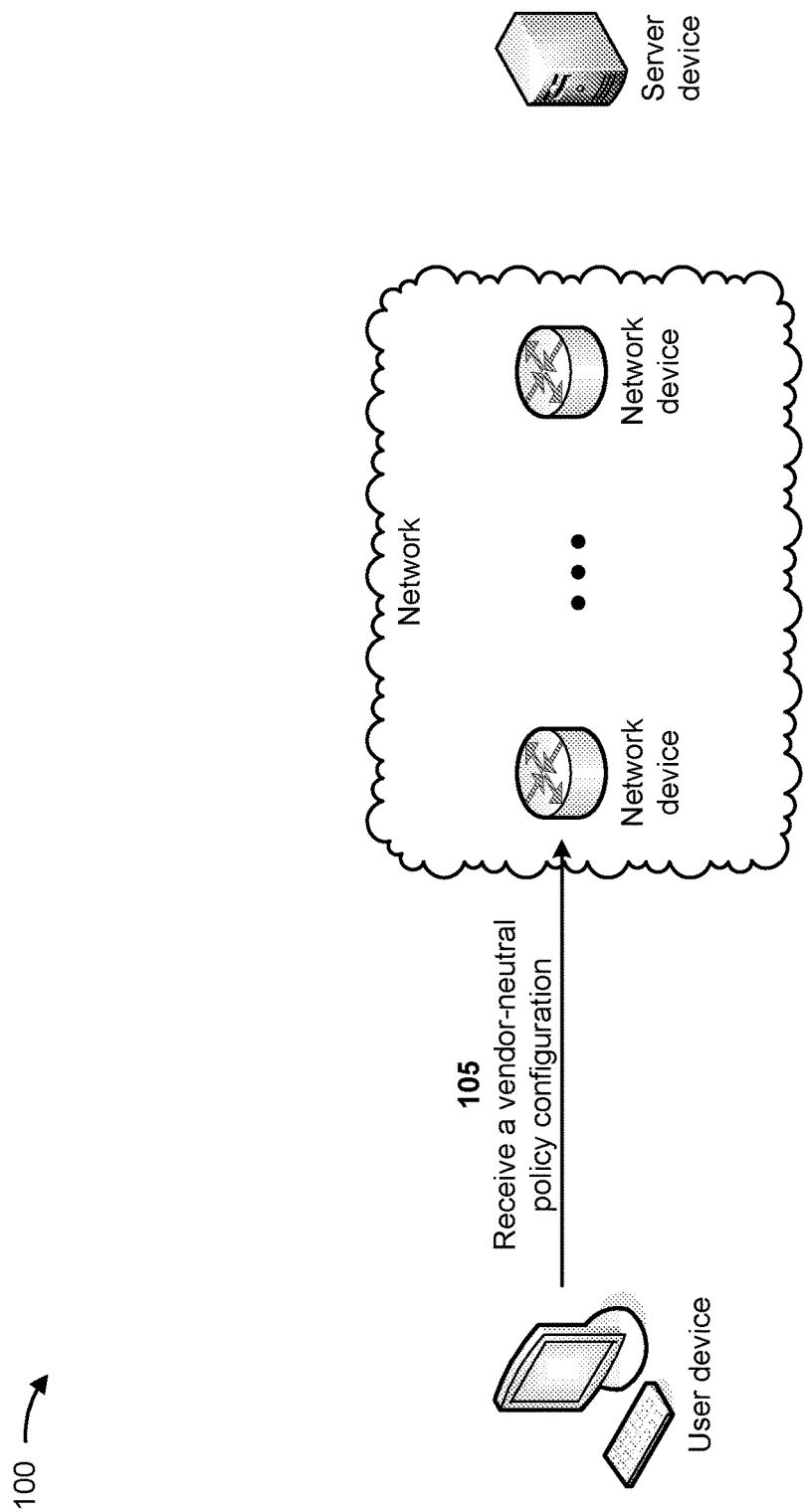
FIGS. 1A-1G are diagrams of an example associated with supporting a vendor-neutral policy configuration on a network device with a vendor-specific policy configuration.

The following detailed description of example implementations refers to the accompanying drawings. The same reference numbers in different drawings may identify the same or similar elements.

A filter is a basic unit of a firewall component of a network device, and may include a set of terms or rules. Each term may include a set of match conditions and actions. A match condition may include a condition used to determine a match with a packet. If the packet satisfies match conditions present in a term, then respective actions may be applied to the packet. The firewall component may process the packet based on each of the terms until the packet is accepted or discarded.

Openconfig provides a set of vendor-neutral data models (e.g., for firewalls) based on operational needs of use cases and requirements of multiple network operators. In an openconfig network instance, both a filter and an interface are under a routing instance hierarchy and a policy is bound to the interface. This associates the filter with both the routing instance and the interface. An openconfig network instance filter configuration may include Internet protocol version 4 (IPv4) and Internet protocol version 6 (IPv6) matches within a single filter and may be within a same term or rule. In contrast, a vendor-specific filter configuration may be associated with either an interface or a routing instance, IPv4 and IPv6 matches cannot be under the same term or rule, and only a Layer-3 family filter can be associated with a routing instance.

Thus, current techniques for providing a firewall component in a network device consume computing resources (e.g., processing resources, memory resources, communication resources, and/or the like), networking resources, and/or the like, associated with providing a vendor-specific filter configuration that fails to support a vendor-neutral filter configuration, failing to filter traffic associated with the vendor-neutral filter configuration, handling security issues caused by failing to filter traffic associated with the vendor-neutral filter configuration, and/or the like.

Some implementations described herein relate to a network device that supports a vendor-neutral policy configuration on the network device with a vendor-specific policy configuration. For example, the network device may receive a vendor-neutral policy configuration, and may translate the vendor-neutral policy configuration to a first family filter and a second family filter. The network device may associate each of the first family filter and the second family filter with a routing instance and an interface, and may generate a policy configuration supported by the network device based on the first family filter, the second family filter, the routing instance, and the interface. The network device may receive packets, and may process the packets with the policy configuration to generate first operational state data associated with the first family filter and second operational state data associated with the second family filter. The network device may store the first operational state data in a first data structure, and may store the second operational state data in a second data structure. The network device may receive a request for operational state data associated with the vendor-neutral policy configuration, may aggregate the first operational state data from the first data structure and the second operational state data from the second data structure to generate the operational state data associated with the vendor-neutral policy configuration, and may return the operational state data associated with the vendor-neutral policy configuration.

In this way, the network device supports a vendor-neutral policy configuration on the network device with a vendor-specific policy configuration. For example, the network device may divide the vendor-neutral policy configuration into two individual Layer-3 filters (e.g., a first filter for family IPv4 address match conditions and a second filter for family IPv6 address match conditions). The network device may associate the first filter and the second filter with a routing instance and an interface by binding the first filter and the second filter to the routing instance and by adding an internal interface match condition to each of the terms in the first filter and the second filter. Since the first filter and the second filter are split, the network device may separately maintain corresponding operational state data for each of the first filter and the second filter. The network device may aggregate the corresponding operational state data for each of the first filter and the second filter whenever the operational state data is requested. Thus, the network device conserves computing resources, networking resources, and/or the like that would otherwise have been consumed by providing a vendor-specific filter configuration that fails to support a vendor-neutral filter configuration, failing to filter traffic associated with the vendor-neutral filter configuration, handling security issues caused by failing to filter traffic associated with the vendor-neutral filter configuration, and/or the like.

FIGS. 1A-1G are diagrams of an example 100 associated with supporting a vendor-neutral policy configuration on a network device with a vendor-specific policy configuration. As shown in FIGS. 1A-1G, example 100 includes a user device and a server device associated with a network of network devices. Further details of the user device, the server device, the network, and the network devices are provided elsewhere herein.

As shown in FIG. 1A, and by reference number 105, the network device may receive a vendor-neutral policy configuration. For example, the network device may initially not support a vendor-neutral policy configuration, such as an openconfig network instance (OC-NI) policy configuration, an openconfig (OC) access control list (ACL) policy configuration, and/or the like. The OC-NI policy configuration may include a Layer-3 forwarding construct (e.g., a virtual routing and forwarding (VRF) instance), a Layer-2 instance (e.g., a virtual switch instance (VSI)), mixed Layer-2 and Layer-3 instances, OC-NI Yang models with Yang definitions, and/or the like. The openconfig ACL policy configuration may include individual ACL rules that specify match criteria based on fields in a packet, an action that defines how matching packets should be handled, OC ACL Yang models with Yang definitions, OC ACL augmented Yang models with Yang definitions, and/or the like. The user device may generate the vendor-neutral policy configuration, and may provide the vendor-neutral policy configuration to the network device. The network device may receive the vendor-neutral policy configuration from the user device or from another device (e.g., a network controller).

In one example, the vendor-neutral policy configuration may include the following (or similar) syntax:

```
network-instances {
    network-instance n1 {
        policy-forwarding {
            policies {
                policy dscp-steer {
                    config {
                        policy-id dscp-steer;
                    }
                    rules {
                        rule 1 {
                            config {
                                sequence-id 1;
                            }
                            ipv4 {
                                config {
                                    dscp < >;
                                }
                            }
                            ipv6 {
                                config {
                                    dscp < >;
                                }
                            }
                            action {
                                config {
                                    network-instance < >;
                                }
                            }
                        }
                    }
                }
            }
        }
    }
}
network-instances {
    network-instance n1 {
        policy-forwarding {
            interfaces {
                interface et-1/0/0.0 {
                    config {
                        apply-forwarding-policy dscp_steer;
                    }
                    interface-ref {
                        config {
                            interface et-1/0/0;
                            subinterface 0;
                        }
                    }
                }
            }
        }
    }
}
```

Figure 1B:
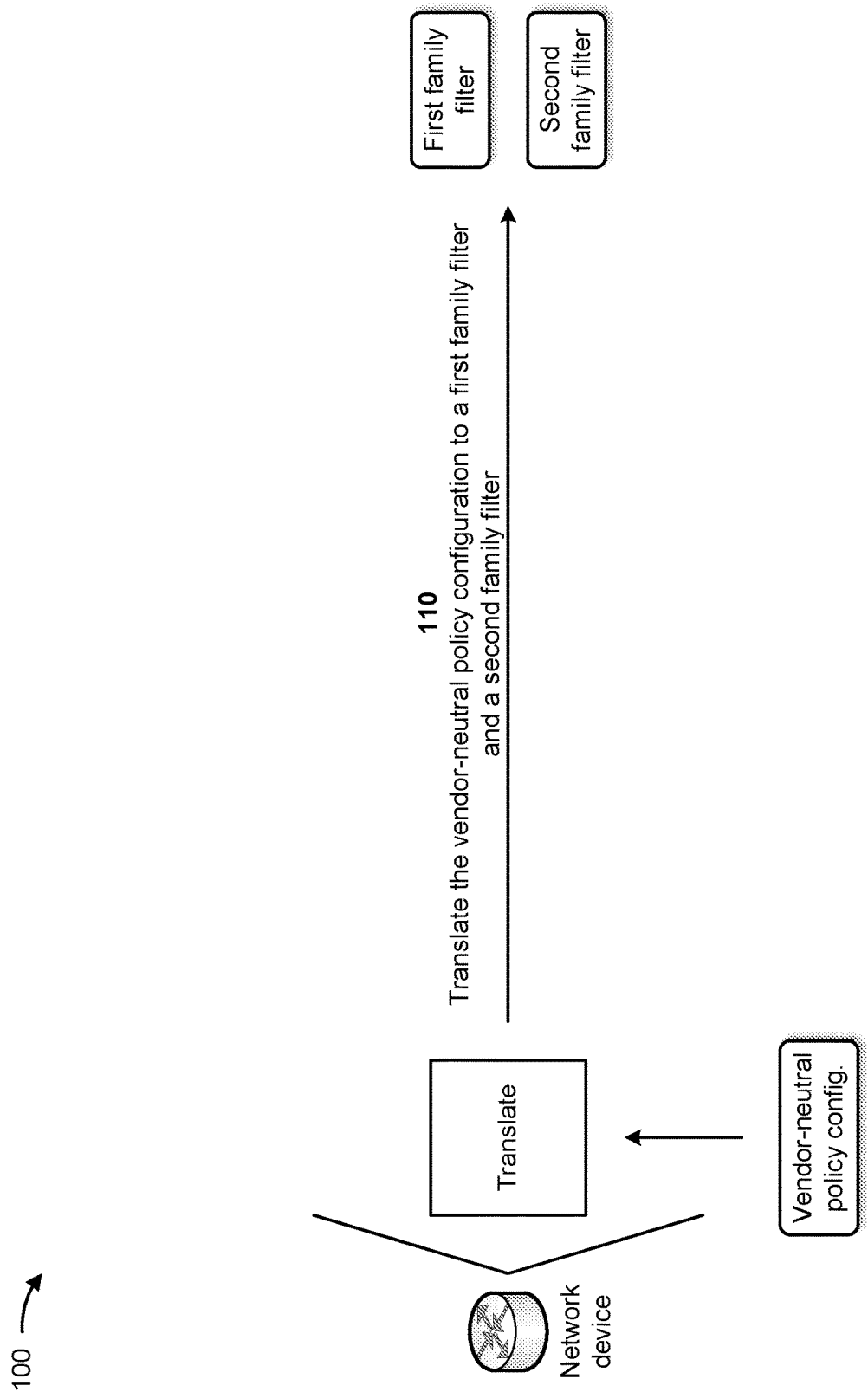

As shown in FIG. 1B, and by reference number 110, the network device may translate the vendor-neutral policy configuration to a first family filter and a second family filter. For example, the network device may translate the vendor-neutral policy configuration by dividing the vendor-neutral policy configuration into two individual Layer-3 filters (e.g., the first family filter and the second family filter). In some implementations, the first family filter is for family IPv4 address match conditions (INET), and the second family filter is for family Ipv6 address match conditions (INET6). In some implementations, the first family filter includes a first set of terms associated with the Ipv4 address match conditions and the second family filter includes a second set of terms associated with the Ipv6 address match conditions. In one example, the network device may translate the vendor-neutral policy configuration to the first family filter and the second family filter with the following (or similar) syntax:

```
//CLI
firewall {
    family inet {
        filter dscp-steer-ipv4-n1 {
            term 1 {
                from {
                    interface et-1/0/0.0;
                    dscp < >;
                }
                then {
                    routing-instance < >;
                }
            }
            term 2 {
                then accept;
            }
        }
    }
    family inet6 {
        filter dscp-steer-ipv6-n1 {
            term 1 {
                from {
                    interface et-1/0/0.0;
                    traffic-class < >;
                }
                then {
                    routing-instance < >;
                }
            }
            term 2 {
                then accept;
            }
        }
    }
}
routing-instances {
    n1 {
        forwarding-options {
            family inet {
                filter {
                    input dscp-steer-ipv4-n1;
                }
            }
            family inet6 {
                filter {
                    input dscp-steer-ipv6-n1;
                }
            }
        }
    }
}
In case of binding to 'default' routing instance
forwarding-options {
    family inet {
        filter {
            input dscp-steer-ipv4-n1;
        }
    }
    family inet6 {
        filter {
            input dscp-steer-ipv6-n1;
        }
    }
}
```

The example above shows how one policy (e.g., dscp-steer) is converted to two family filters, the first family filter of family INET (e.g., dscp-steer-ipv4-n1) and the second family filter of family INET6 (e.g., dscp-steer-ipv6-n1). IPv4 matches may be copied to the first family filter, IPv6 matches may be copied to the second family filter, and actions may be duplicated to both filters. This conversion or translation of the vendor-neutral policy configuration to multiple filters enables the network device to provide the same behavior as that of an any family filter that is applied on route table.

If a new vendor-neutral policy configuration (e.g., an OC-NI policy configuration) is received by the network device, the network device may identify a network-instance name and policy name in the new vendor-neutral policy configuration. For each rule under the policy, the network device may repeat the following procedures. If IPv4 matches are present under the rule, the network device may create a first family filter with a name that is a combination of the policy name, IPv4, the network instance name, and a term name (e.g., a rule name). If IPv6 matches are present under the rule, the network device may create a second family filter with a name that is a combination of the policy name, IPv6, the network instance name, and a term name (e.g., a rule name). The network device may identify the IPv4 matches under an OC-NI rule and may copy the IPv4 matches to the term under the first family filter. The network device may identify the IPv6 matches under an OC-NI rule and may copy the IPv6 matches to the term under the second family filter. The network device may clone actions (if any) to the term of the first family filter, and may copy actions (if any) to the term of the second family filter. The network device may apply the first family filter and the second family filter to a route table. If a rule does not include IPv4 matches, the respective term may be skipped for the first family filter. If a rule does not include IPv6 matches, the respective term may be skipped for the second family filter.

In one example, the network device may process a new vendor-neutral policy configuration according to the following (or similar) syntax:

```
network-instances {
    network-instance n1 { << network instance name >>
        policy-forwarding {
            policies {
                policy dscp-steer { << policy name >>
                    config {
                        policy-id dscp-steer;
                    }
                    rules {
                        rule 1 { << rule number >>
                            config {
                                sequence-id 1;
                            }
                            ipv4 { << ipv4 match >>
                                config {
                                    dscp < >;
                                }
                            }
                            ipv6 { << ipv6 match >>
                                config {
                                    dscp < >;
                                }
                            }
                            action {
                                config {
                                    network-instance < >;
                                }
                            }
                        }
                    }
                }
            }
        }
    }
}
```

Figure 1C:
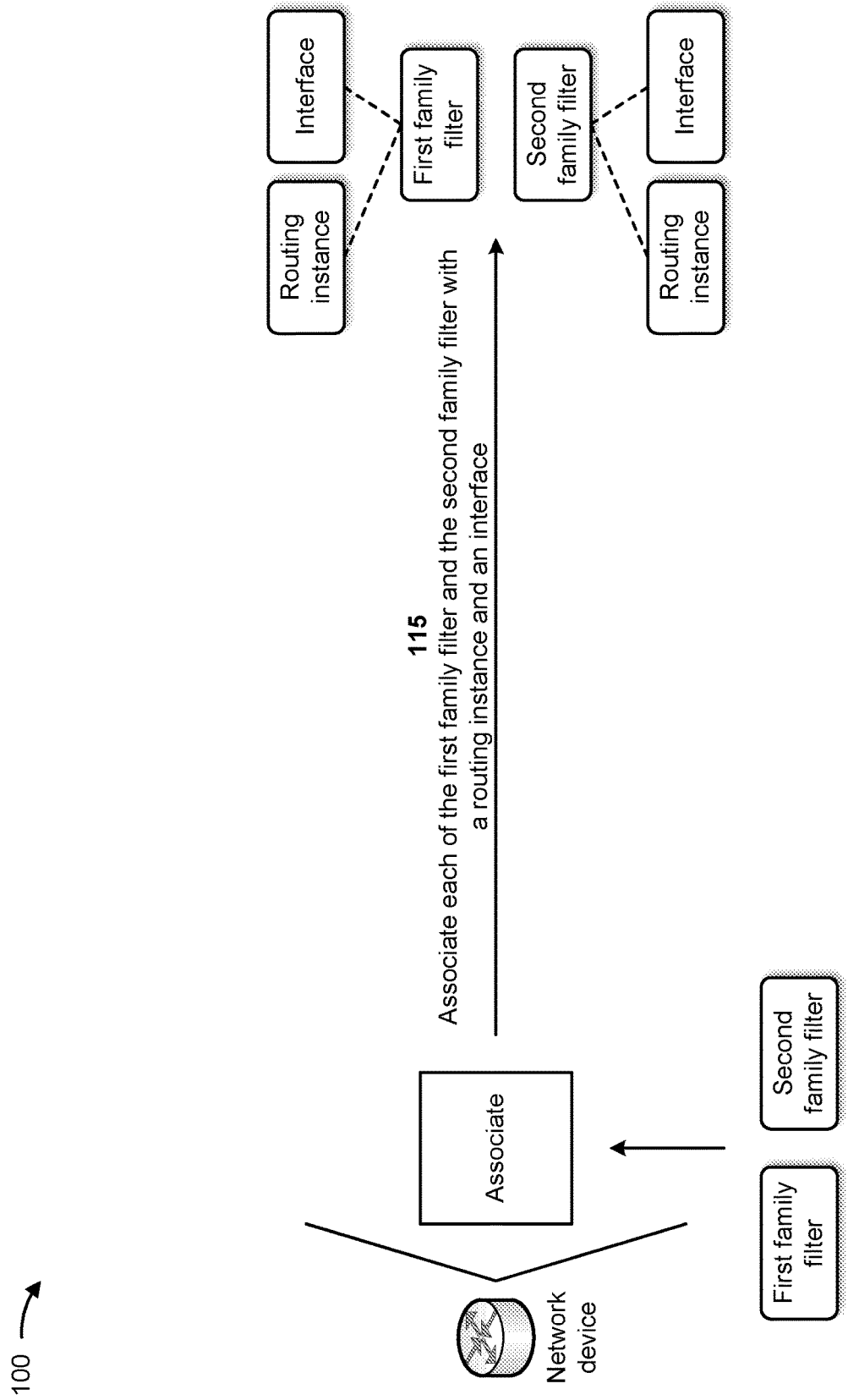

As shown in FIG. 1C, and by reference number 115, the network device may associate each of the first family filter and the second family filter with a routing instance and an interface. For example, the network device may associate each of the first family filter and the second family filter with the routing instance by binding the first family filter and the second family filter to the routing instance. The network device may associate each of the first family filter and the second family filter with the interface by adding an internal interface match condition to each of the terms in the first family filter and the second family filter.

Figure 1D:
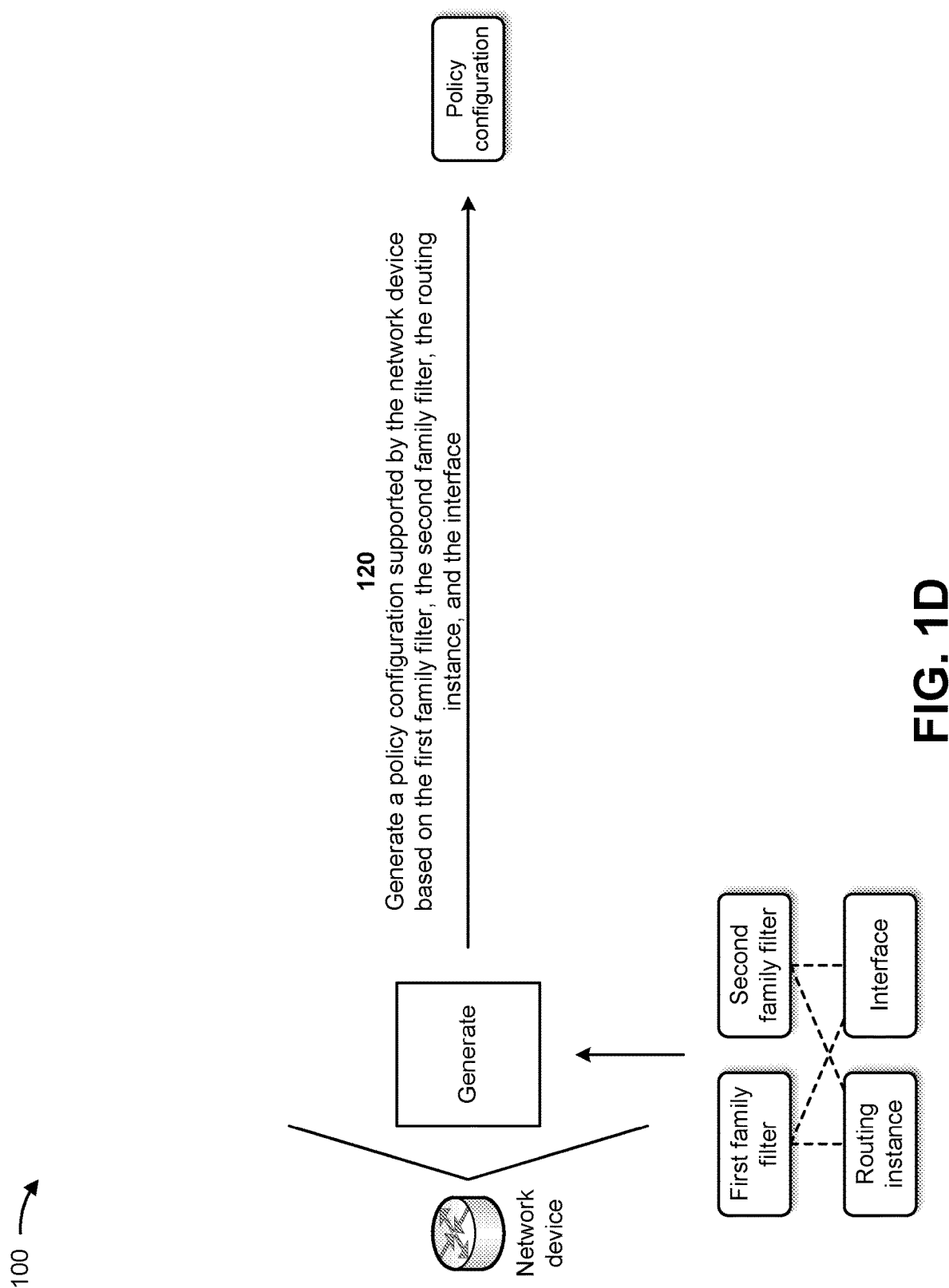

As shown in FIG. 1D, and by reference number 120, the network device may generate a policy configuration supported by the network device based on the first family filter, the second family filter, the routing instance, and the interface. For example, after dividing the vendor-neutral policy configuration into the first family filter and the second family filter and associating the first family filter and the second family filter with the routing instance and the interface, the vendor-neutral policy configuration may be converted to a policy configuration that is understood and supported by the network device. In this way, the network device may support vendor-neutral policy configurations as well as vendor-specific policy configurations.

Figure 1E:
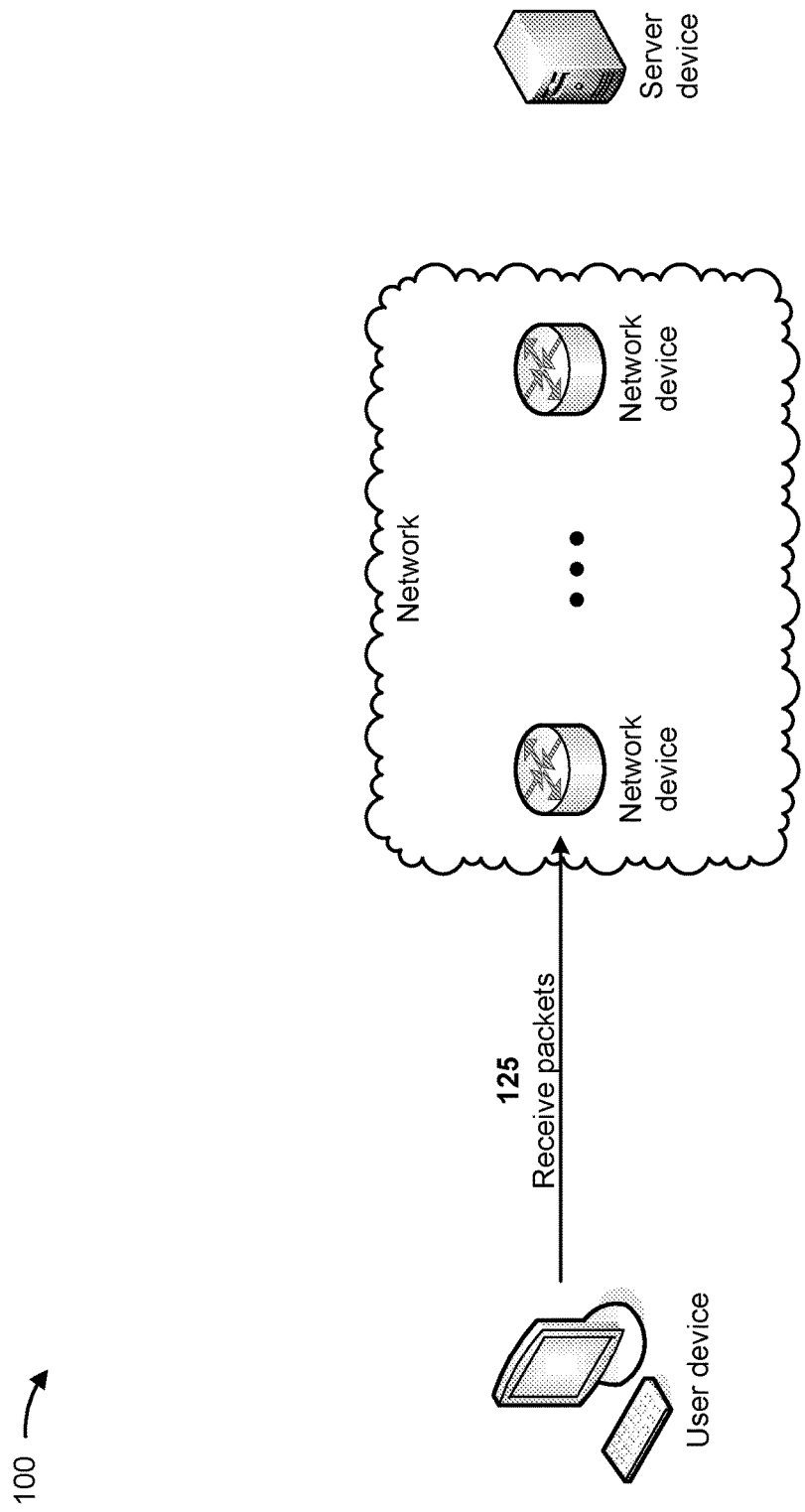

As shown in FIG. 1E, and by reference number 125, the network device may receive packets. For example, the user device may generate network traffic (e.g., packets) and may provide the packets to the network device. The network device may receive the packets from the user device. In some implementations, the network device may receive the packets from the server device or from another network device.

Figure 1F:
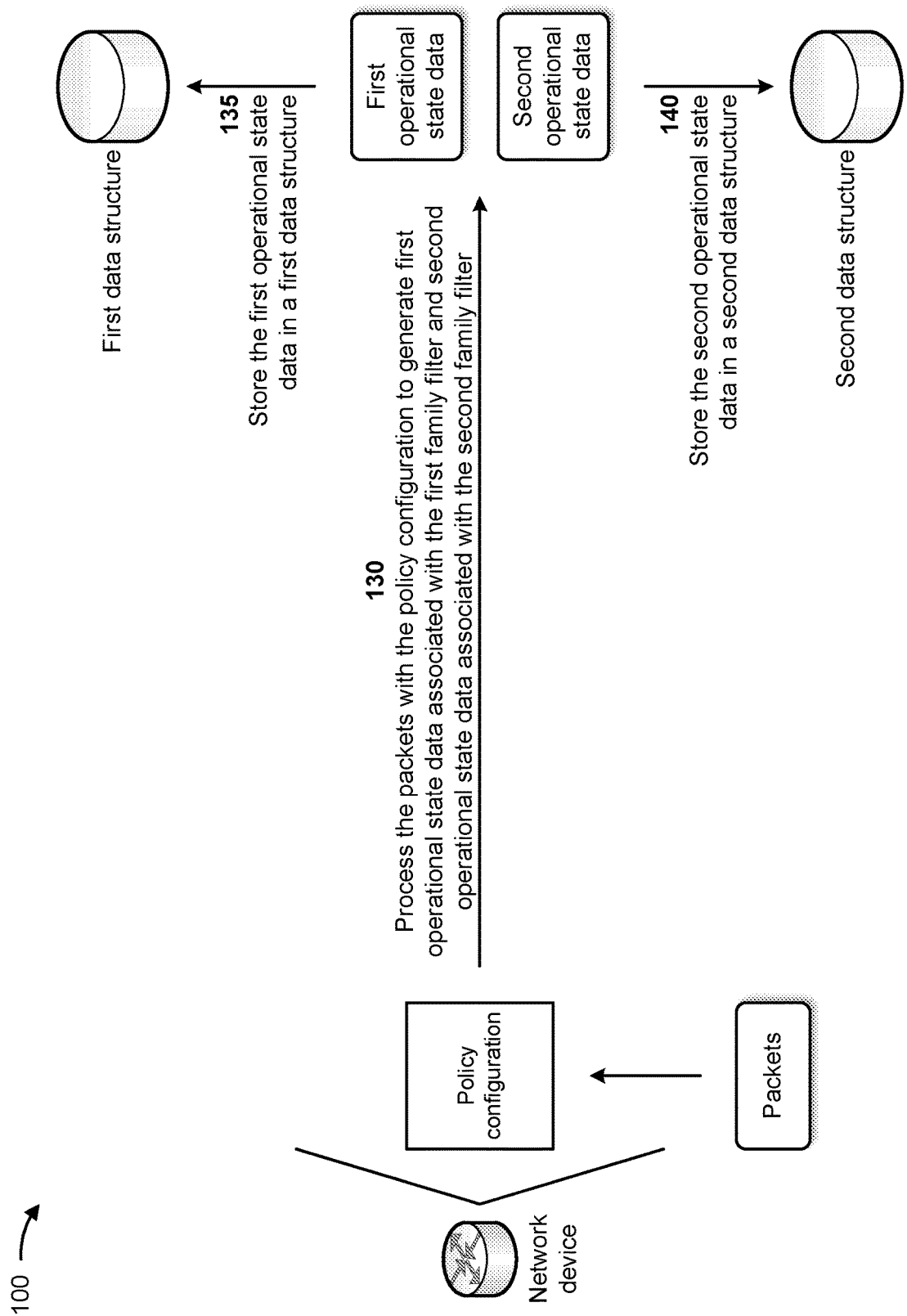

As shown in FIG. 1F, and by reference number 130, the network device may process the packets with the policy configuration to generate first operational state data associated with the first family filter and second operational state data associated with the second family filter. For example, a firewall component of the network device may receive the packets and may process the packets with the policy configuration. Processing of the packets with the policy configuration may cause the first family filter to generate the first operational state data (e.g., monitoring data and telemetry data) and may cause the second family filter to generate the second operational state data. Operational state data for the vendor-neutral policy configuration (e.g., monitoring data and telemetry data) may be served along with configuration data. During the configuration phase, the vendor-neutral policy configuration containing both IPv4 and IPv6 matches within a single filter is divided into the two Layer-3 family filters. Thus, the first family filter generates the first operational state data and the second family filter generates the second operational state data. In one example, the two Layer-3 family filters may generate the first operational state data and the second operational state data according to the following (or similar) syntax:

```
root@sflow-ardbeg01> show firewall
    Filter: dscp-steer-ipv4-n1
    Counters:
    Name                Bytes           Packets
    1                   200             100
    Filter: dscp-steer-ipv6-n1
    Counters:
    Name                Bytes           Packets
    1                   300             150
root@sflow-ardbeg01>
```

Figure 1G:
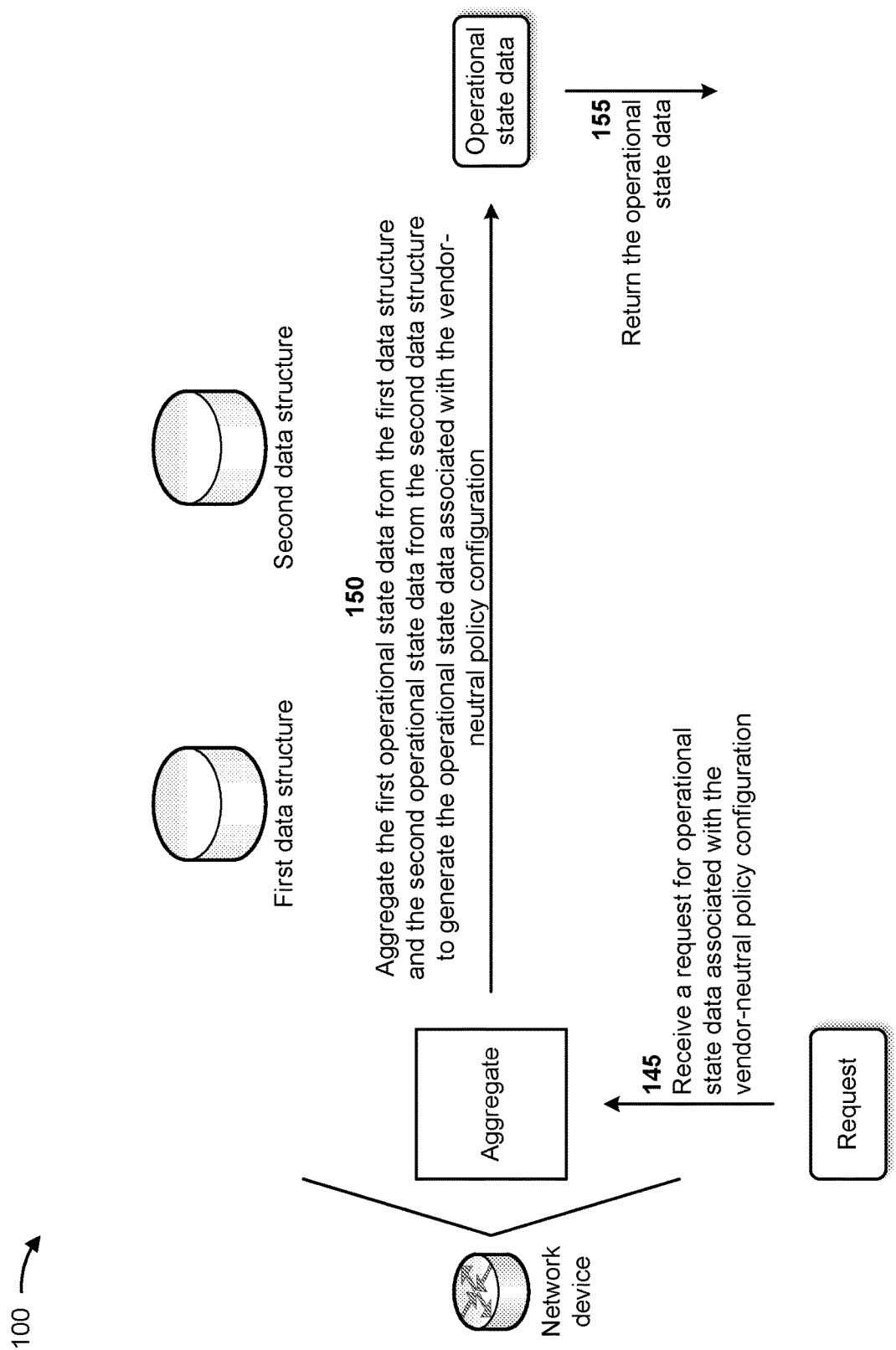

The dividing of a single filter/policy (e.g., dscp-steer) into the first family filter (e.g., dscp-steer-ipv4-n1) and the second family filter (e.g., dscp-steer-ipv6-n1) creates an issue with returning operational state data. Operational state data from two individual filters cannot be returned directly since only one filter (e.g., the vendor-neutral policy configuration) is configured for the vendor-neutral policy configuration. Instead, the operational state data from the first family filter and the second family filter need to be aggregated into the single filter and returned to a requester. FIGS. 1F and 1G describe how the network device addresses this issue.

As further shown in FIG. 1F, and by reference number 135, the network device may store the first operational state data in a first data structure. For example, the network device may be associated with a first data structure (e.g., a database, a table, a list, and/or the like) and a second data structure. When the first family filter generates the first operational state data (e.g., based on processing the packets), the network device may store the first operational state data in the first data structure. In some implementations, the network device may utilize a key (e.g., network instance+policy name, value=filter information) when storing the first operational state data in the first data structure.

As further shown in FIG. 1F, and by reference number 140, the network device may store the second operational state data in a second data structure. For example, when the second family filter generates the second operational state data (e.g., based on processing the packets), the network device may store the second operational state data in the second data structure. In some implementations, the network device may utilize a key (e.g., network instance+policy name, value=filter information) when storing the second operational state data in the second data structure.

As shown in FIG. 1G, and by reference number 145, the network device may receive a request for operational state data associated with the vendor-neutral policy configuration. For example, the user device may generate the request for the operational state data associated with the vendor-neutral policy configuration, and may provide the request to the network device. The network device may receive the request for operational state data associated with the vendor-neutral policy configuration from the user device or from another device (e.g., the server device). In one example, the request may include a request for operational state data for a policy (e.g., dscp-steer) under a network instance (e.g., n1).

As further shown in FIG. 1G, and by reference number 150, the network device may aggregate the first operational state data from the first data structure and the second operational state data from the second data structure to generate the operational state data associated with the vendor-neutral policy configuration. For example, based on the request for operational state data associated with the vendor-neutral policy configuration, the network device may perform a lookup in the first data structure for the key (e.g., n1+dscp-steer) to retrieve first filter information, and may perform a lookup in the second data structure for the key to retrieve second filter information. The network device may retrieve first rules associated with the first filter information and second rules associated with the second filter information. For each of the first rules, the network device may retrieve first matches and first actions. For each of the second rules, the network device may retrieve second matches and second actions. The first filter information, the first rules, the first matches, and the first actions may correspond to the first operational state data. The second filter information, the second rules, the second matches, and the second actions may correspond to the second operational state data. The network device may aggregate the first operational state data and the second operational state data to generate the operational state data associated with the vendor-neutral policy configuration.

In one example, the network device may aggregate the first operational state data and the second operational state data to generate the operational state data according to the following (or similar) syntax:

```
<output>
<data>
<network-instances>
   <network-instance>
      <name>n1 </name>
      <state>
         <name>n1 </name>
      </state>
      <policy-forwarding>
         <policies>
            <policy>
               <policy-id>dscp-steer</policy-id>
               <state>
                  <policy-id>dscp-steer</policy-id>
               </state>
               <rules>
                  <rule>
                     <sequence-id>1</sequence-id>
                     <state>
                        <sequence-id>1</sequence-id>
                        <matched-pkts>250</matched-pkts> <<Aggregated stats
                        <matched-octets>500</matched-octets> <<Aggregated stats
                     </state>
                     <ipv4>
                        <state>
                           <dscp>56</dscp>
                        </state>
                     </ipv4>
                     <ipv6>
                        <state>
                           <dscp>56</dscp>
                        </state>
                     </ipv6>
                     <action>
                        <state>
                           <network-instance>mgmt</network-instance>
                        </state>
                     </action>
                  </rule>
               </rules>
            </policy>
         </policies>
      </policy-forwarding>
   </network-instance>
</network-instances>
</data>
</output>
```

As further shown in FIG. 1G, and by reference number 155, the network device may return the operational state data. For example, the network device may return the operational state data associated with the vendor-neutral policy configuration to a requester of the operational state data. In some implementations, the network device may return the operational state data associated with the vendor-neutral policy configuration to the user device, the server device, or another device.

Furthermore, implementations described herein may be utilized for ACLs or policies that do not support both IPv4 and IPv6 under the same rule, and may be utilized for vendor-neutral models, such as openconfig models that do not fit into a native Yang model or are not supported by hardware.

In this way, the network device supports a vendor-neutral policy configuration on the network device with a vendor-specific policy configuration. For example, the network device may divide the vendor-neutral policy configuration into two individual Layer-3 filters (e.g., a first filter and a second filter). The network device may associate the first filter and the second filter with a routing instance and an interface by binding the first filter and the second filter to the routing instance and by adding an internal interface match condition to each of the terms in the first filter and the second filter. Since the first filter and the second filter are split, the network device may separately maintain corresponding operational state data for each of the first filter and the second filter. The network device may aggregate the corresponding operational state data for each of the first filter and the second filter whenever the operational state data is requested. Thus, the network device conserves computing resources, networking resources, and/or the like that would otherwise have been consumed by providing a vendor-specific filter configuration that fails to support a vendor-neutral filter configuration, failing to filter traffic associated with the vendor-neutral filter configuration, handling security issues caused by failing to filter traffic associated with the vendor-neutral filter configuration, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
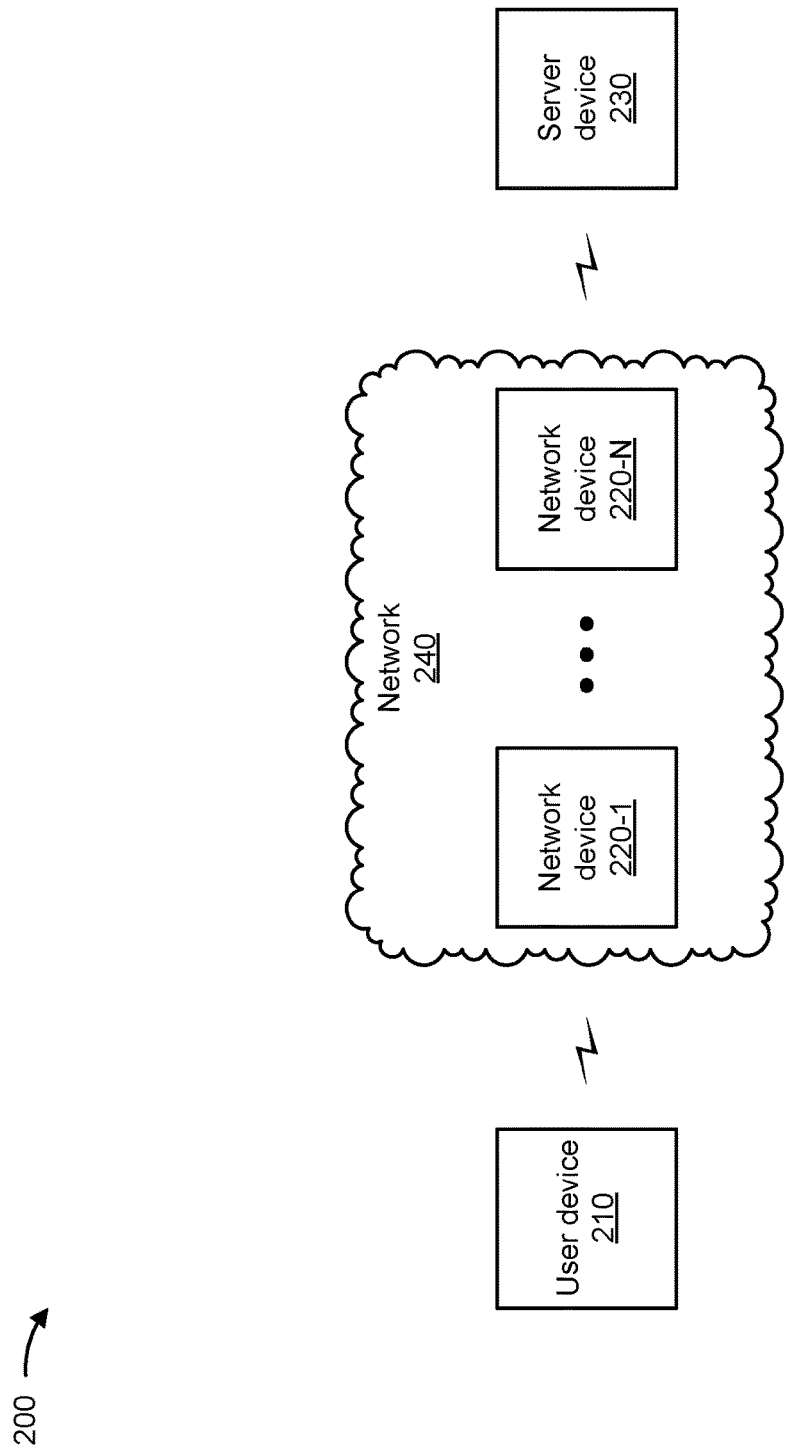
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a group of network devices 220 (shown as network device 220-1 through network device 220-N), a server device 230, and a network 240. Devices of the environment 200 may interconnect via wired connections, wireless connections, or a combination of wired and wireless connections.

The user device 210 may include one or more devices capable of receiving, generating, storing, processing, and/or providing information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
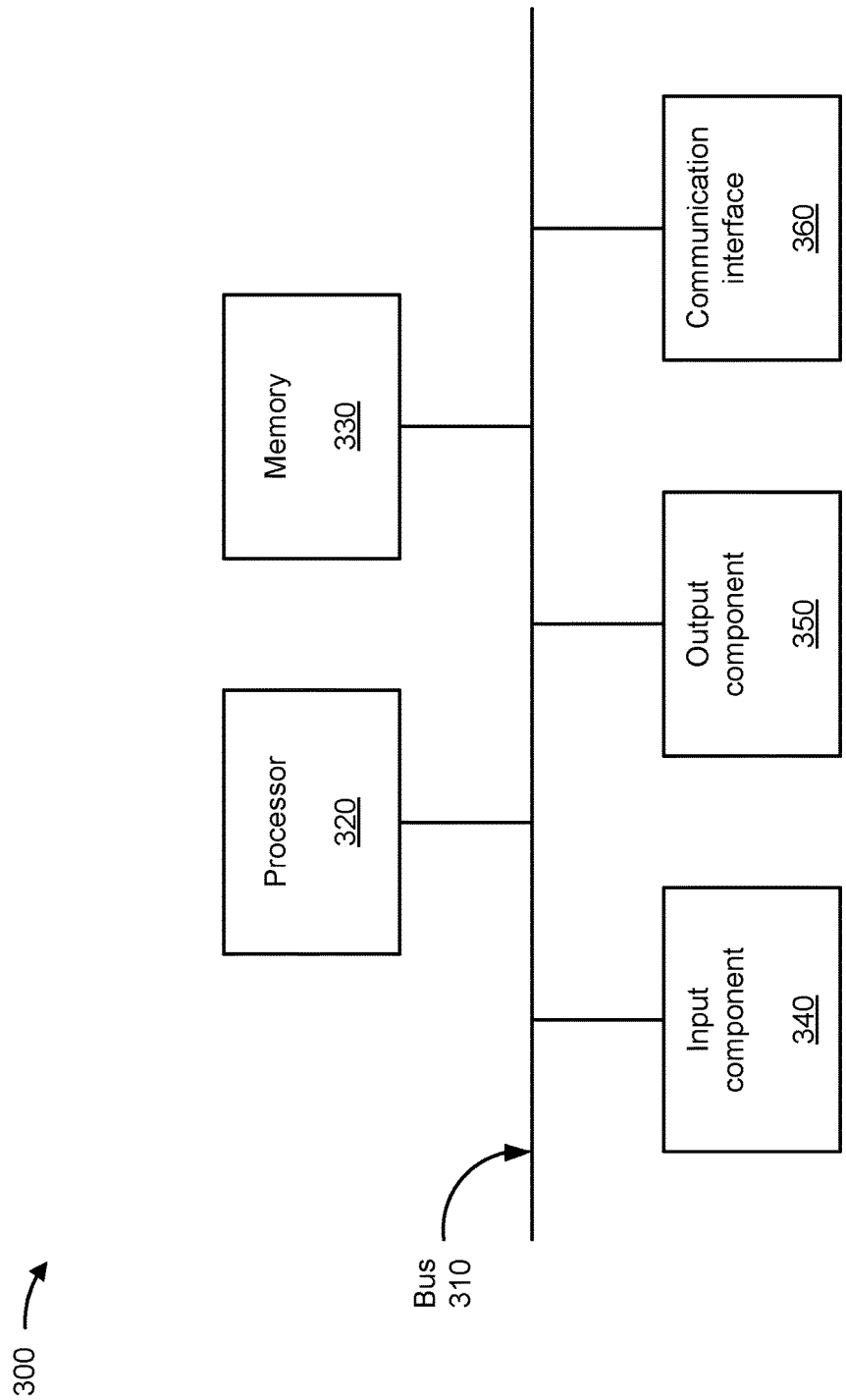
FIGS. 3 and 4 are diagrams of example components of one or more devices of FIG. 2.

FIG. 3 is a diagram of example components of one or more devices of FIG. 2. The example components may be included in a device 300, which may correspond to the user device 210, the network device 220, and/or the server device 230. In some implementations, the user device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
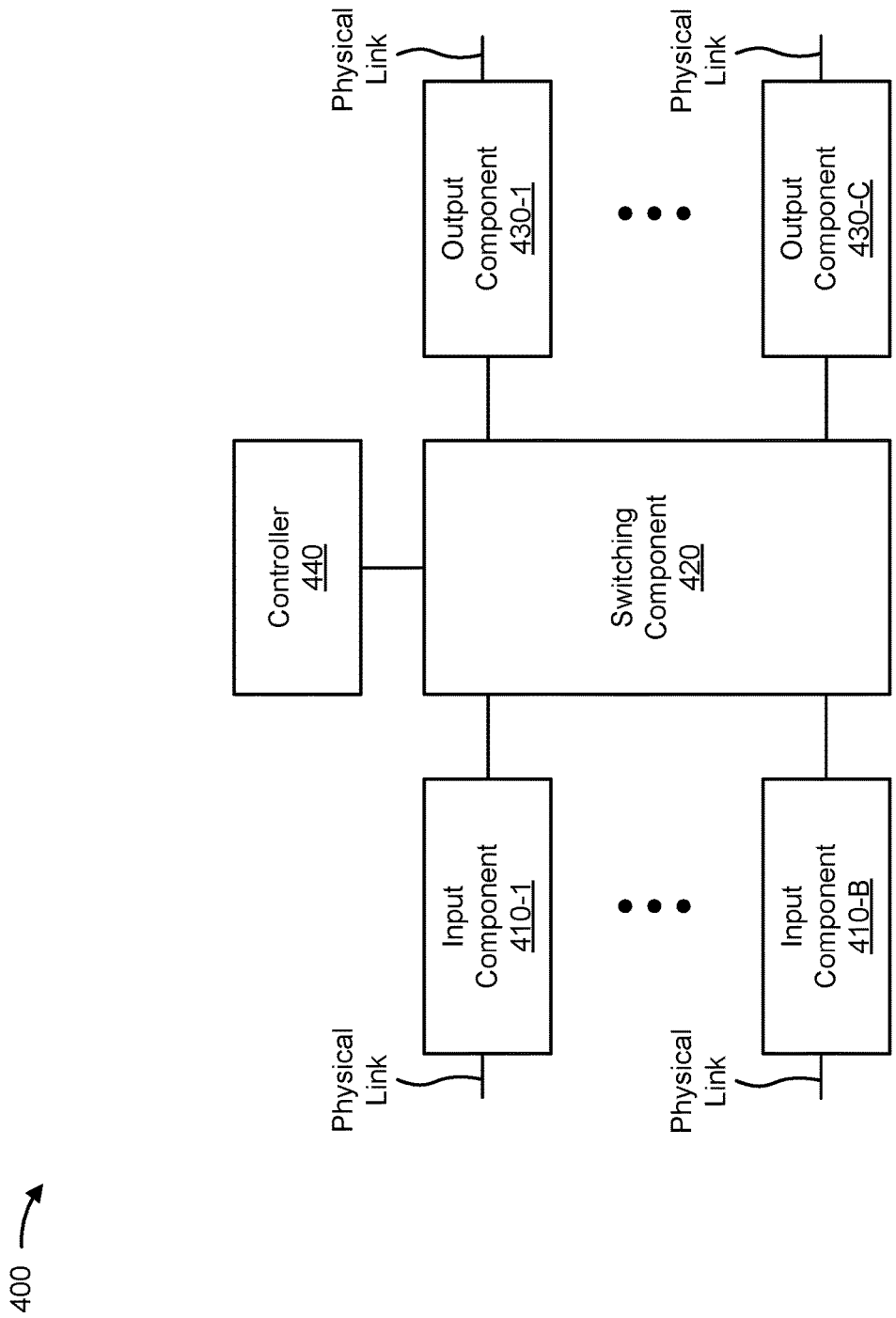

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for supporting a vendor-neutral policy configuration on a network device with a vendor-specific policy configuration. In some implementations, one or more process blocks of FIG. 5 may be performed by a network device (e.g., the network device 220). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a vendor-neutral policy configuration (block 510). For example, the network device may receive a vendor-neutral policy configuration, as described above. In some implementations, the vendor-neutral policy configuration is an openconfig network instance policy configuration. In some implementations, the vendor-neutral policy configuration is an openconfig access control list policy configuration. In some implementations, the vendor-neutral policy configuration includes vendor-neutral data models.

As further shown in FIG. 5, process 500 may include translating the vendor-neutral policy configuration to a first family filter and a second family filter (block 520). For example, the network device may translate the vendor-neutral policy configuration to a first family filter and a second family filter, as described above. In some implementations, each of the first family filter and the second family filter is a Layer-3 filter. In some implementations, the first family filter is for family Internet protocol version 4 address match conditions. In some implementations, the second family filter is for family Internet protocol version 6 address match conditions. In some implementations, the first family filter includes a first set of terms and the second family filter includes a second set of terms.

As further shown in FIG. 5, process 500 may include associating each of the first family filter and the second family filter with a routing instance and an interface (block 530). For example, the network device may associate each of the first family filter and the second family filter with a routing instance and an interface, as described above.

As further shown in FIG. 5, process 500 may include generating a policy configuration supported by the network device based on the first family filter, the second family filter, the routing instance, and the interface (block 540). For example, the network device may generate a policy configuration supported by the network device based on the first family filter, the second family filter, the routing instance, and the interface, as described above. In some implementations, the policy configuration is for a firewall component of the network device.

In some implementations, process 500 includes receiving packets, and processing the packets with the policy configuration to generate first operational state data associated with the first family filter and second operational state data associated with the second family filter. In some implementations, each of the first operational state data and the second operational state data is monitoring data or telemetry data. In some implementations, process 500 includes storing the first operational state data in a first data structure, and storing the second operational state data in a second data structure.

In some implementations, process 500 includes receiving a request for operational state data associated with the vendor-neutral policy configuration, aggregating the first operational state data from the first data structure and the second operational state data from the second data structure to generate the operational state data associated with the vendor-neutral policy configuration, and returning the operational state data associated with the vendor-neutral policy configuration.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device, a vendor-neutral policy configuration;
    translating, by the network device, the vendor-neutral policy configuration to a first family filter and a second family filter;
    associating, by the network device, each of the first family filter and the second family filter with a routing instance and an interface;
    generating, by the network device, a policy configuration supported by the network device based on the first family filter, the second family filter, the routing instance, and the interface;
    processing, by the network device, packets with the policy configuration to generate first operational state data associated with the first family filter and second operational state data associated with the second family filter;
    receiving, by the network device, a request for operational state data associated with the vendor-neutral policy configuration;
    aggregating, by the network device, the first operational state data and the second operational state data to generate the operational state data associated with the vendor-neutral policy configuration; and
    returning, by the network device, the operational state data associated with the vendor-neutral policy configuration.

2. The method of claim 1, further comprising:
    receiving the packets.

3. The method of claim 2, wherein each of the first operational state data and the second operational state data is monitoring data or telemetry data.

4. The method of claim 2, further comprising:
    storing the first operational state data in a first data structure; and
    storing the second operational state data in a second data structure.

5. The method of claim 1, wherein the vendor-neutral policy configuration is an openconfig network instance policy configuration.

6. The method of claim 1, wherein the vendor-neutral policy configuration is an openconfig access control list policy configuration.

7. A network device, comprising:
    one or more memories; and
    one or more processors, coupled to the one or more memories, configured to:
    receive a vendor-neutral policy configuration;
    translate the vendor-neutral policy configuration to a first family filter and a second family filter;
    associate each of the first family filter and the second family filter with a routing instance and an interface;
    generate a policy configuration supported by the network device based on the first family filter, the second family filter, the routing instance, and the interface;
    receive packets;
    process the packets with the policy configuration to generate first operational state data associated with the first family filter and second operational state data associated with the second family filter;
    receive a request for operational state data associated with the vendor-neutral policy configuration;
    aggregate the first operational state data and the second operational state data to generate the operational state data associated with the vendor-neutral policy configuration; and
    return the operational state data associated with the vendor-neutral policy configuration.

8. The network device of claim 7, wherein the vendor-neutral policy configuration includes vendor-neutral data models.

9. The network device of claim 7, wherein each of the first family filter and the second family filter is a Layer-3 filter.

10. The network device of claim 7, wherein the first family filter is for family Internet protocol version 4 address match conditions.

11. The network device of claim 7, wherein the second family filter is for family Internet protocol version 6 address match conditions.

12. The network device of claim 7, wherein the first family filter includes a first set of terms and the second family filter includes a second set of terms.

13. The network device of claim 7, wherein the policy configuration is for a firewall component of the network device.

14. A non-transitory computer-readable medium storing a set of instructions, the set of instructions comprising:
    one or more instructions that, when executed by one or more processors of a network device, cause the network device to:
    receive a vendor-neutral policy configuration;
    translate the vendor-neutral policy configuration to a first family filter and a second family filter;
    associate each of the first family filter and the second family filter with a routing instance and an interface;
    generate a policy configuration supported by the network device based on the first family filter, the second family filter, the routing instance, and the interface,
        wherein the policy configuration is for a firewall component of the network device;
    process packets with the policy configuration to generate first operational state data associated with the first family filter and second operational state data associated with the second family filter;
    receive a request for operational state data associated with the vendor-neutral policy configuration;
    aggregate the first operational state data and the second operational state data to generate the operational state data associated with the vendor-neutral policy configuration; and
    return the operational state data associated with the vendor-neutral policy configuration.

15. The non-transitory computer-readable medium of claim 14, wherein the one or more instructions further cause the network device to:
- receive packets;
- store the first operational state data in a first data structure; and
- store the second operational state data in a second data structure.

16. The non-transitory computer-readable medium of claim 14, wherein the vendor-neutral policy configuration is an openconfig network instance policy configuration or an openconfig access control list policy configuration.

17. The non-transitory computer-readable medium of claim 14, wherein each of the first family filter and the second family filter is a Layer-3 filter.

18. The non-transitory computer-readable medium of claim 14, wherein the first family filter is for family Internet protocol version 4 address match conditions, and the second family filter is for family Internet protocol version 6 address match conditions.

19. The method of claim 1, wherein the policy configuration is for a firewall component of the network device.

20. The non-transitory computer-readable medium of claim 14, wherein each of the first operational state data and the second operational state data is monitoring data or telemetry data.

* * * * *